United States Patent
White

(10) Patent No.: US 9,634,579 B2
(45) Date of Patent: Apr. 25, 2017

(54) SYSTEMS AND METHODS FOR CONTROLLING INVERTERS

(71) Applicant: Hamilton Sundstrand Corporation, Charlotte, NC (US)

(72) Inventor: Adam M. White, Belvidere (IL)

(73) Assignee: Hamilton Sundstrand Corporation, Charlotte, NC (US)

( * ) Notice: Subject to any disclaimer, the term of this patent is extended or adjusted under 35 U.S.C. 154(b) by 28 days.

(21) Appl. No.: 14/678,334

(22) Filed: Apr. 3, 2015

(65) Prior Publication Data
US 2016/0294303 A1    Oct. 6, 2016

(51) Int. Cl.
*H02M 7/537*    (2006.01)
*H02M 7/487*    (2007.01)
*H02M 1/00*    (2006.01)
*H02M 1/12*    (2006.01)

(52) U.S. Cl.
CPC ........... *H02M 7/537* (2013.01); *H02M 7/487* (2013.01); *H02M 2001/0025* (2013.01); *H02M 2001/123* (2013.01)

(58) Field of Classification Search
CPC .................................................. H02M 7/537
See application file for complete search history.

(56) References Cited

U.S. PATENT DOCUMENTS

| 3,916,285 | A | * | 10/1975 | Iwata | H02M 7/527 363/41 |
| 4,772,996 | A | * | 9/1988 | Hanei | H02M 7/53873 318/811 |
| 5,790,396 | A | * | 8/1998 | Miyazaki | H02M 7/487 363/41 |
| 6,069,808 | A | * | 5/2000 | Panahi | H02M 7/53875 363/98 |

(Continued)

FOREIGN PATENT DOCUMENTS

| EP | 1855375 A1 | 11/2007 |
| JP | H08317663 A | 11/1996 |
| KR | 101379202 B1 | 3/2014 |

OTHER PUBLICATIONS

Paper written by Fukuta Y et al: "Reduced common-mode modulation strategies for cascaded multilevel inverters", IEEE Transactions on Industry Applications, IEEE Service Center, Piscataway, NJ, US, vol. 39, No. 5, Sep. 1, 2003 (Sep. 1, 2003), pp. 1386-1395, XP011101683, ISSN: 0093-9994, DOI: 10.1109/TIA.2003. 816547 * p. 1388, left-hand column, paragraph II.A*.

(Continued)

*Primary Examiner* — Timothy J Dole
*Assistant Examiner* — Yusef Ahmed
(74) *Attorney, Agent, or Firm* — Locke Lord LLP; Scott D. Wofsy; Christopher J. Cillié

(57) ABSTRACT

A method of controlling an inverter includes receiving a target waveform for output voltage of an inverter phase, calculating a phase bias for an inverter phase using the target (Continued)

waveform, biasing the target waveform using the phase bias, and generating a switching device command signal by comparing the biased target waveform to a carrier waveform. The switching device command signal has a switching patter that reduces midpoint current in an inverter input lead and common mode voltage in an inverter output lead.

12 Claims, 10 Drawing Sheets

(56) References Cited

U.S. PATENT DOCUMENTS

| | | | | |
|---|---|---|---|---|
| 6,324,038 B1 * | 11/2001 | Kishibe | ............... | B60L 3/003 361/31 |
| 6,400,107 B1 * | 6/2002 | Nakatani | ............... | H02P 6/085 318/400.21 |
| 6,819,077 B1 * | 11/2004 | Seibel | ............... | H02M 7/53873 318/799 |
| 6,844,697 B2 * | 1/2005 | Masaki | ............... | H02P 6/18 318/721 |
| 6,903,948 B2 * | 6/2005 | Yoshida | ............... | H02M 1/08 363/41 |
| 9,083,261 B2 * | 7/2015 | Yang | ............... | H02M 7/487 |
| 9,362,840 B2 * | 6/2016 | Kato | ............... | H02M 7/487 |
| 2003/0142517 A1 * | 7/2003 | Furukawa | ............... | H02M 7/53875 363/37 |
| 2005/0025231 A1 * | 2/2005 | Mitsuki | ............... | H02M 7/5395 375/238 |
| 2005/0163237 A1 * | 7/2005 | Katanaya | ............... | H02P 27/08 375/260 |
| 2005/0174076 A1 * | 8/2005 | Katanaya | ............... | H02M 7/53873 318/400.28 |
| 2006/0120121 A1 * | 6/2006 | Chang | ............... | H02M 7/4826 363/71 |
| 2006/0215430 A1 * | 9/2006 | Fu | ............... | H02M 7/53873 363/101 |
| 2007/0177690 A1 * | 8/2007 | Watanabe | ............... | G04G 5/002 375/316 |
| 2008/0265829 A1 * | 10/2008 | Hayashi | ............... | H02P 21/18 318/781 |
| 2010/0110743 A1 * | 5/2010 | Yamasaki | ............... | H02M 7/53873 363/132 |
| 2011/0032739 A1 * | 2/2011 | Juhlin | ............... | H02M 7/48 363/127 |
| 2011/0241583 A1 * | 10/2011 | He | ............... | H02P 21/0021 318/400.09 |
| 2011/0241584 A1 * | 10/2011 | He | ............... | H02P 6/08 318/400.09 |
| 2011/0248663 A1 * | 10/2011 | Yamakawa | ............... | B60L 11/08 318/805 |
| 2011/0269496 A1 * | 11/2011 | Shinohara | ............... | H04W 52/283 455/522 |
| 2012/0032620 A1 * | 2/2012 | Shimada | ............... | H02P 21/0089 318/400.09 |
| 2012/0075900 A1 * | 3/2012 | Nakagawa | ............... | H02M 7/53875 363/132 |
| 2013/0155740 A1 * | 6/2013 | Takubo | ............... | H02M 7/53871 363/98 |
| 2014/0077738 A1 * | 3/2014 | Iwaji | ............... | H02P 27/08 318/400.36 |
| 2014/0268948 A1 * | 9/2014 | White | ............... | H02M 7/493 363/71 |
| 2014/0268967 A1 * | 9/2014 | White | ............... | H02M 1/44 363/133 |
| 2014/0313804 A1 * | 10/2014 | Urushibata | ............... | H02M 7/487 363/132 |
| 2015/0236609 A1 * | 8/2015 | Kato | ............... | H02M 7/06 363/78 |
| 2015/0256105 A1 * | 9/2015 | Kano | ............... | B60L 11/1803 307/10.1 |
| 2016/0105127 A1 * | 4/2016 | Miyake | ............... | H02M 7/537 363/97 |
| 2016/0141977 A1 * | 5/2016 | Oka | ............... | H02M 7/487 318/504 |

OTHER PUBLICATIONS

European Search Report from European Patent Office dated Sep. 5, 2016 for Application No. EP16163725.

* cited by examiner

SYSTEMS AND METHODS FOR CONTROLLING INVERTERS

BACKGROUND OF THE INVENTION

1. Field of the Invention

The present invention relates generally to power conversion, and more particularly to inverters for converting direct current power into alternating current power.

2. Description of Related Art

Aircraft power systems commonly include power converters to convert power of one type to a type suitable for power-consuming devices coupled to the aircraft power distribution system. For example, rectifiers are generally employed to convert alternating current (AC) power into direct current (DC) power. Inverters are typically employed to convert DC power into AC power. One type of inverter commonly employed is such applications is the neutral-point-clamped (NPC) inverter. Neutral-point-clamped inverters are generally coupled to a DC power source with a DC link having a source lead and a return lead. An additional midpoint lead is created by the series connection of capacitors to the power source. The voltage differential between the source and returns leads and midpoint lead is generally about half the potential difference across the power source, thereby reducing the voltage rating of components required for the inverter.

Some multilevel inverters can exhibit voltage imbalance across DC link leads. DC link capacitors are commonly employed to reduce voltage imbalance, generally with a first capacitor connected between the DC source lead and the midpoint lead and a second capacitor disposed between the DC return lead and the midpoint lead. The DC link capacitors are typically sized according to the voltage imbalance characteristic of a specific application.

Such conventional methods and systems have generally been considered satisfactory for their intended purpose. However, there is still a need in the art for improved power converters. The present disclosure provides a solution for this need.

SUMMARY OF THE INVENTION

A method of controlling an inverter includes receiving a target waveform for output voltage of an inverter phase, calculating a phase bias for an inverter phase using the target waveform, biasing the target waveform using the phase bias, and generating a switching device command signal by comparing the biased target waveform to a carrier waveform. The switching device command signal has a switching pattern that reduces midpoint current in an inverter input lead and common mode voltage in the inverter output leads.

In certain embodiments biasing the target waveform further can include generating first and second reference signals using the target waveform. The method can also include adding the phase bias to the first reference signal and subtracting the phase from the second reference signal. The switching command signal can be an upper switch command signal for an upper switch of a phase leg of the inverter, and generating the upper switch command signal by comparing the first switching command signal to a first carrier wave.

It is contemplated that an intermediate lower switch command signal can be generated using an inverse of the output of the first switching command signal and first carrier wave comparison, an intermediate upper switch command signal can be generated by comparing the second switching command signal to a second carrier wave, and a lower switch command signal can be generated using an inverse of the output of the second switching command signal and second carrier wave comparison for switches of the phase leg.

In accordance with certain embodiments the target waveform can be one of a plurality of target waveforms for the inverter. For example, the inverter can be a three-phase inverter, the waveform can be an A-phase waveform, and the method can include receiving B-phase and C-phase target waveforms. The phase bias can be an A-phase bias, and the method can include calculating a B-phase bias and a C-phase bias.

It is also contemplated that, in accordance with certain embodiments, calculating the phase bias further can include comparing an uncompensated midpoint duty cycle to a target midpoint duty cycle for a phase of the inverter. The uncompensated midpoint duty cycle for a phase of the inverter can be calculated by subtracting a 0 min function of the target waveform from a 0 max function of the target waveform. The target midpoint duty cycle for a phase of the inverter can be calculated by subtracting from one a maximum of an absolute value of the target waveform.

A controller for an inverter includes a processor and memory. The memory is communicative with the processor and has recorded thereon instructions that, when read by the processor, cause the processor to receive a target waveform representative of output voltage of an inverter phase, calculate a phase bias for an inverter phase using the target waveform, bias the target waveform using the phase bias, and generate a switching device command signal by comparing the biased target waveform to a carrier waveform, wherein the switching device command signal reduces midpoint current in an inverter input lead and common mode voltage in the inverter output leads.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below, wherein.

DETAILED DESCRIPTION OF THE PREFERRED EMBODIMENTS

Figure 1:
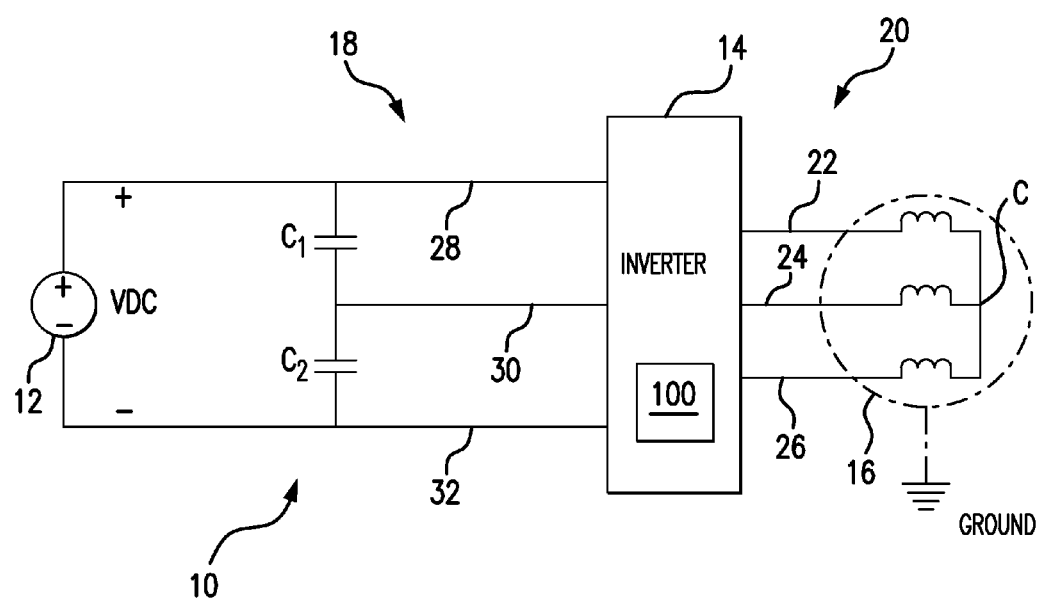
FIG. 1 is a schematic view of an exemplary embodiment of a power system constructed in accordance with the present disclosure, showing a power converter with a controller.

Reference will now be made to the drawings wherein like reference numerals identify similar structural features or aspects of the subject disclosure. For purposes of explanation and illustration, and not limitation, a partial view of an exemplary embodiment of an inverter controller in accordance with the disclosure is shown in FIG. 1 and is designated generally by reference character 100. Other embodiments of inverters and method of controlling inverters accordance with the disclosure, or aspects thereof, are provided in FIGS. 2-10, as will be described. The systems and methods described herein can be used for power conversion systems, such as inverters for converting direct current (DC) power into alternating current (AC) power such as in aircraft power distribution systems.

Referring now to FIG. 1, power distribution system 10 is shown. Power distribution system 10 includes a DC power source 12, a converter 14, and an electrical load 16. A DC link 18 with a plurality of leads couples DC power source 12 to converter 14. An AC link 20 connected converter 14 with electrical load 16. In the illustrated exemplary power system, electrical load 16 is a three-phase AC load connected to converter 14 with an A-phase lead 22, a B-phase lead 24, and a C-phase lead 26. Exemplary converter 14 is a multilevel neutral-point-clamped inverter connected to DC power source 12 with a DC positive lead 28, and a DC negative lead 32. A first balancing capacitor $C_1$ is connected in series between DC positive lead 28 and a DC midpoint lead 30. A second balancing capacitor $C_2$ is connected in series between DC negative lead 32 and DC midpoint lead 30.

In some applications, non-idealities in the operation of the some types of neutral-point clamped inverters can cause current flow through the DC midpoint lead to oscillate. One approach to address midpoint lead current oscillation is to increase the size of the balancing capacitors employed on the DC link. While suitable for its intended purpose, this approach may increase the weight of the power conversion system. An alternative approach is change the operation of the converter. However, this approach can impose a low-frequency common mode voltage at the inverter output (e.g., a voltage between the terminal illustrated with a 'C' in FIG. 1 and ground), which can require larger weight capacitors and inductors within the common mode filter associated with the phase leads. Converter 14 includes a controller operatively associated with converter 14 to reduce (or cancel) both midpoint current and common mode voltage.

Figure 2:
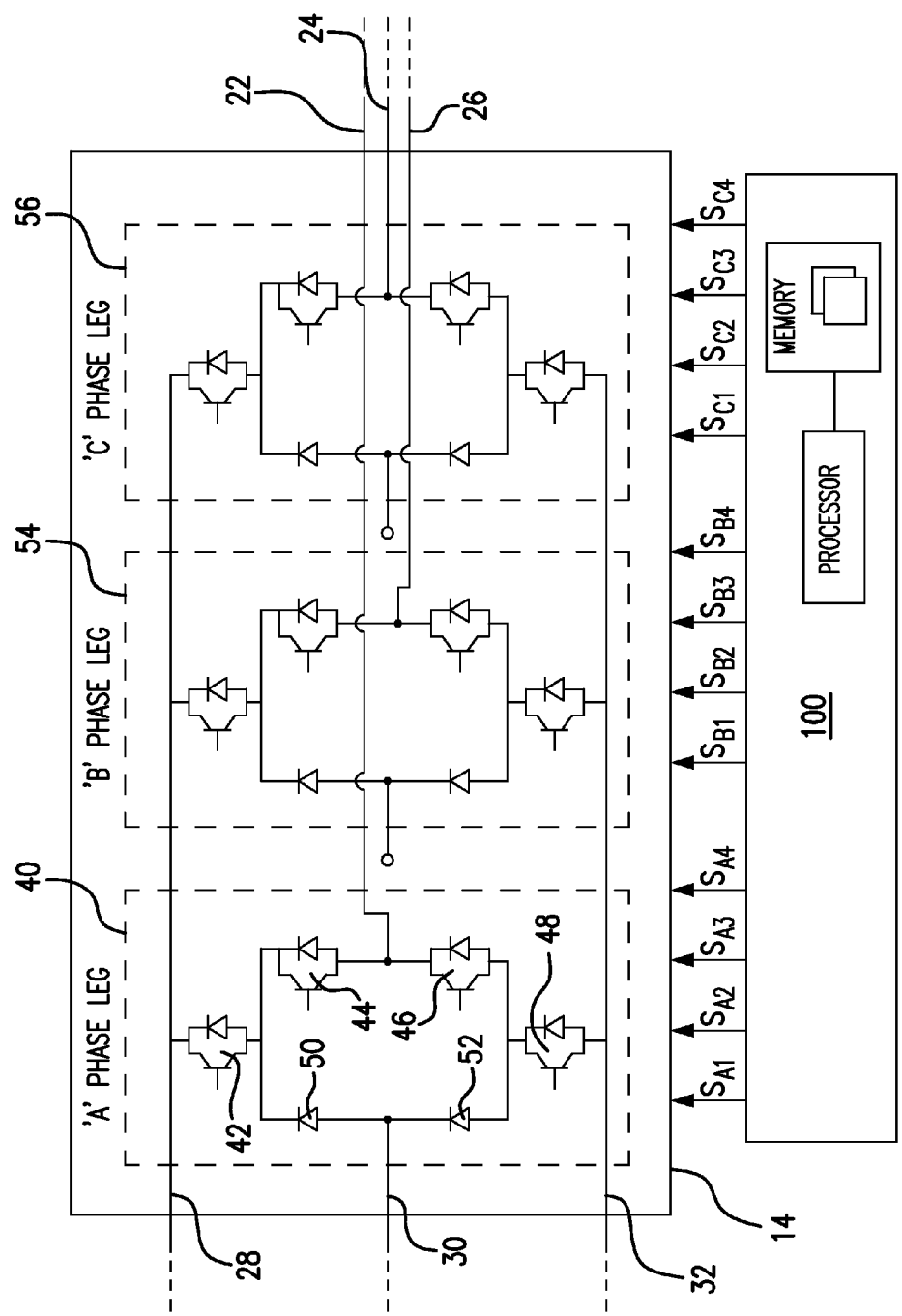
FIG. 2 is a schematic view of the converter of FIG. 1, showing the converter switches.

With reference to FIG. 2, converter 14 is shown. Exemplary converter 14 generally includes a plurality of solid-state switches connected in series with one another and having freewheeling diodes connected in parallel with each switch. Clamping diodes are also arranged in series between phase legs and DC midpoint lead 30. In this respect an A-phase leg 40 includes an upper switch 42, a mid-upper switch 44, a mid-lower switch 46, and a lower switch 48 that each connected in series with one another between DC positive lead 28 and DC negative lead 32. A first clamping diode 50 is connected in series between upper switch 42 and DC midpoint lead 30, and a second clamping diode 52 is connected is series between lower switch 48 and DC midpoint lead 30. A-phase lead 22 is connected between mid-upper switch 44 and mid-lower switch 46. B-phase leg 54 and C-phase leg 56 are similar in arrangement as A-phase leg 40 with the distinction that B-phase leg 54 is connected to B-phase lead 24 and C-phase leg 56 is connected to C-phase lead 26.

Controller 100 is operatively connected to each of the solid-state switching devices of converter 14 for selectively connecting each of AC phase leads (i.e. A-phase lead 22, B-phase lead 24, and C-phase lead 26) with one of the DC leads (i.e. DC positive lead 28, DC midpoint lead 30, and DC negative lead 32) at a given moment in time for synthesizing AC power with predetermined frequency using constant frequency DC power. In this respect, command signals generated by controller 100 are used to control the AC output voltages generated by converter 14. For example, controller 100 selectively connects each AC output voltage to positive DC lead 28, DC negative lead 32, or DC midpoint lead 30 as required in order to generate the desired AC output waveforms.

Proper selection of the control signals allows controller 100 to reduce or eliminate midpoint current and common-mode voltages otherwise generated by power inverter 36. In this way, midpoint current oscillation that could otherwise occur on DC midpoint lead 30 and/or common mode voltage that could otherwise occur at node 'C' with respect to ground within electrical load 16 are prevented.

Figure 3:
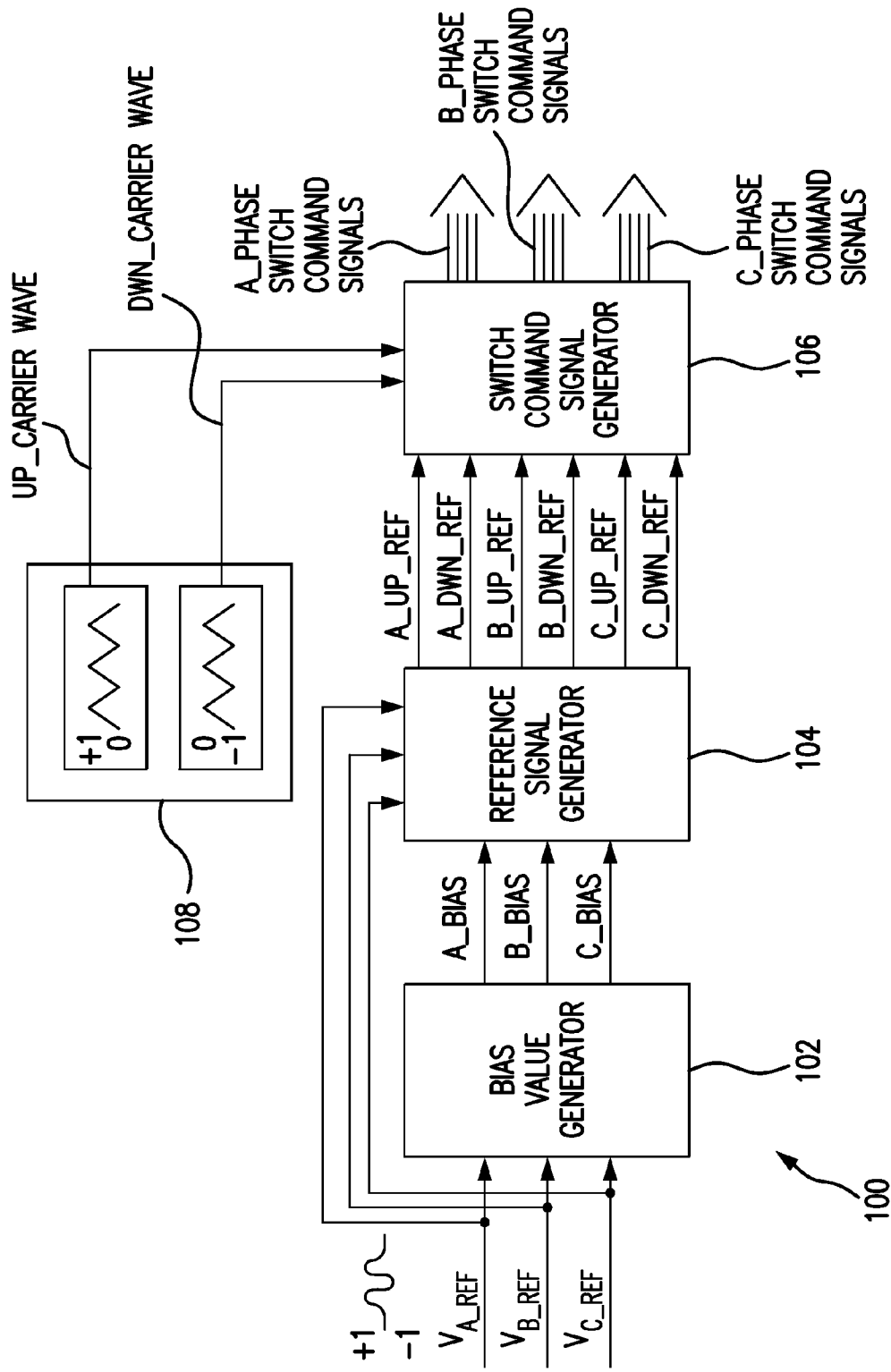
FIG. 3 is a block diagram of the controller of the power converter of FIG. 1, showing the modules, module inputs, and module outputs used for generating the switch command signals.

With reference to FIG. 3, a block diagram of an exemplary embodiment of controller 100 is shown. In the illustrated embodiment, controller 100 includes a bias value generator 102, a reference signal generator 104, a switch command signal generator 106, and a carrier wave generator 108. Controller 100 provides a method of simultaneously reducing or eliminating common-mode voltage and reducing (or eliminating) oscillations in the midpoint current flowing through DC midpoint lead 30. Components included within controller 100 may be implemented as circuitry, software, or a combination of software and circuitry.

Bias value generator 102 receives target waveforms (e.g., $V_{A\_REF}$, $V_{B\_REF}$, and $V_{C\_REF}$) that represent predetermined output voltage targets for converter 14 (shown in FIG. 2). The target waveforms may be generated by a motor control algorithm (e.g., field oriented control) that receives one or more feedback signals used to control the generation of the AC outputs. Examples of feedback signals include monitored AC output current, monitored AC output frequency, monitored DC link voltage, monitored DC link current, or a combination thereof.

Bias value generator 102 generates bias value waveforms (e.g., $A_{BIAS}$, $B_{BIAS}$, and $C_{BIAS}$) that are associated with each phase of converter 14 (shown in FIG. 2), and provides the bias value waveforms to reference signal generator 104. Reference signal generator 104 receives the bias value waveforms and the target waveforms. Using the target waveforms and the bias waveforms, the reference signal generator generates a pair of reference signal waveforms (e.g., A_UP_REF and A_DWN_REF) for each of the phase legs of converter 14, and provides the reference signal waveforms to switch command signal generator 106.

Switch command signal generator 106 receives reference signal waveforms. Switch command signal generator also receives first and second carrier waveforms (e.g. UP_CARRIER and DWN_CARRIER), and compares each of the reference signal waveforms to the carrier waveforms using a pulse width (PWM) comparison engine to generate command signals (e.g. A-Phase Switch Command Signals) for each of the switches of the phase legs of converter 14 (shown in FIG. 2). The carrier waves may be triangle waves. The command signal may be a binary high-low signal that closes and opens the switch receiving the signal.

Figure 4:
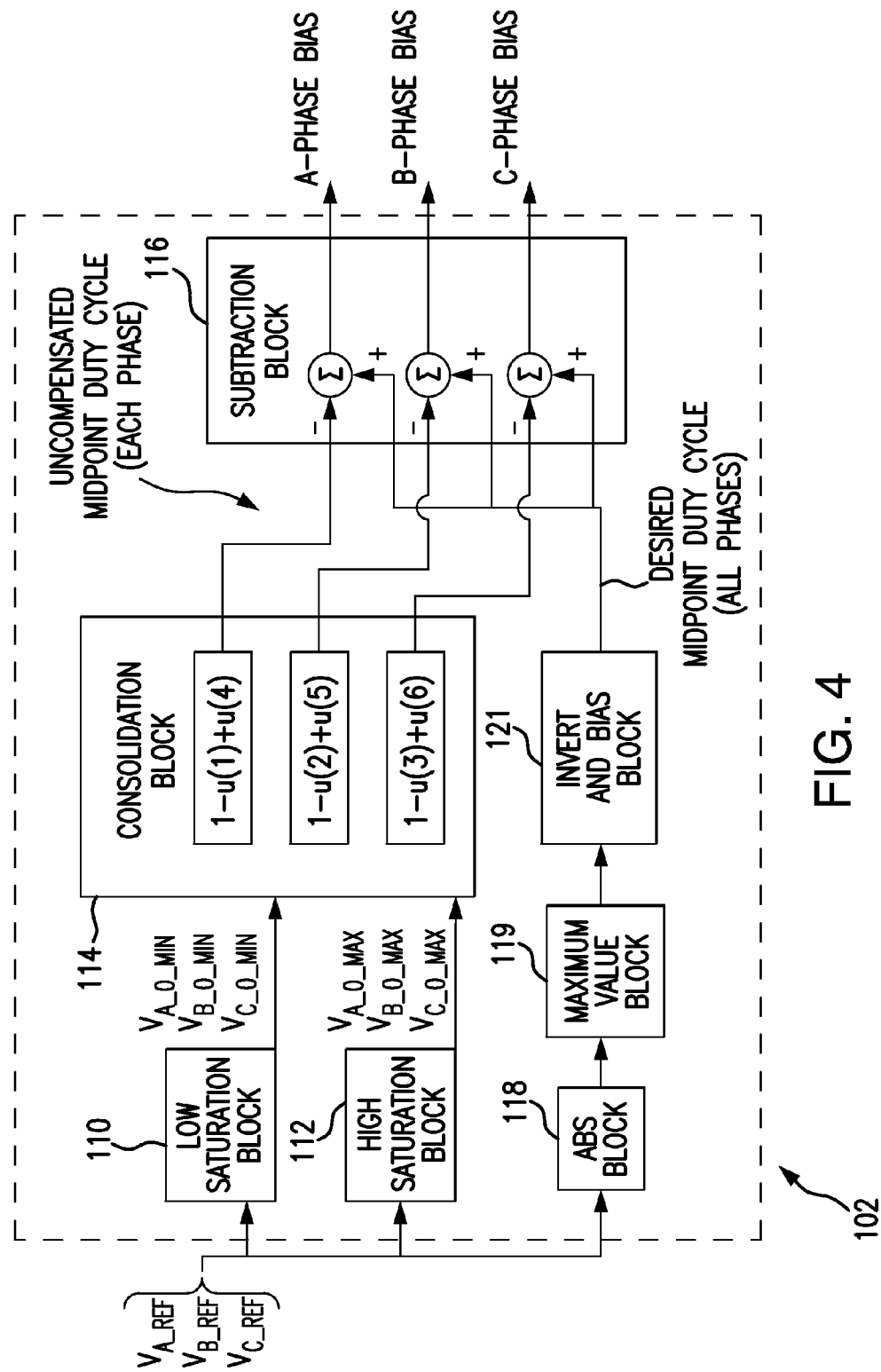
FIG. 4 is a logic flow diagram for the bias value generator module of the controller of FIG. 3, showing how the bias value generator module generates the bias values.

With reference to FIG. 4, a logic flow diagram for bias value generator 102 is shown. Bias value generator 102 includes a low saturation block 110, a high saturation block 112, a consolidation block 114, and a subtraction block 116. Bias value generator 102 also includes an absolute value block 118, a maximum value block 119, and an invert and bias block 121.

Bias value generator 102 receives the phase target waveforms, e.g. $V_{A\_REF}$, $V_{B\_REF}$, and $V_{C\_REF}$, at low saturation block 110, high saturation block 112, and absolute value block 118. Absolute value block 118, maximum value block 119, and invert and bias block 121 cooperatively generate a desired midpoint duty cycle waveform for all phases and provide the desired midpoint duty cycle waveform to subtraction block 116.

Low saturation block 110 generates a positive amplitude waveform corresponding to the received phase target waveforms by replacing negative waveform values with zeros, and provides the resulting waveforms, e.g. $V_{A\_0\_MIN}$, $V_{B\_0\_MIN}$, and $V_{C\_0\_MIN}$, to consolidation block 114. High saturation block 112 generates a negative amplitude waveform for corresponding to inverter phase by replacing positive values within each of the received target waveforms with zeros. This produces two waveforms per inverter phase.

The positive amplitude and negative amplitude waveforms for each phase are provided to consolidation block 114. For each phase, consolidation block subtracts the positive amplitude waveform output of low saturation block 110 and adds the negative amplitude waveform of high saturation block 112 to a constant value of 1. The waveforms calculated by consolidation block 114 are thereafter provided as uncompensated midpoint duty cycle waveforms associated with each phase to subtraction block 116.

Figure 5:
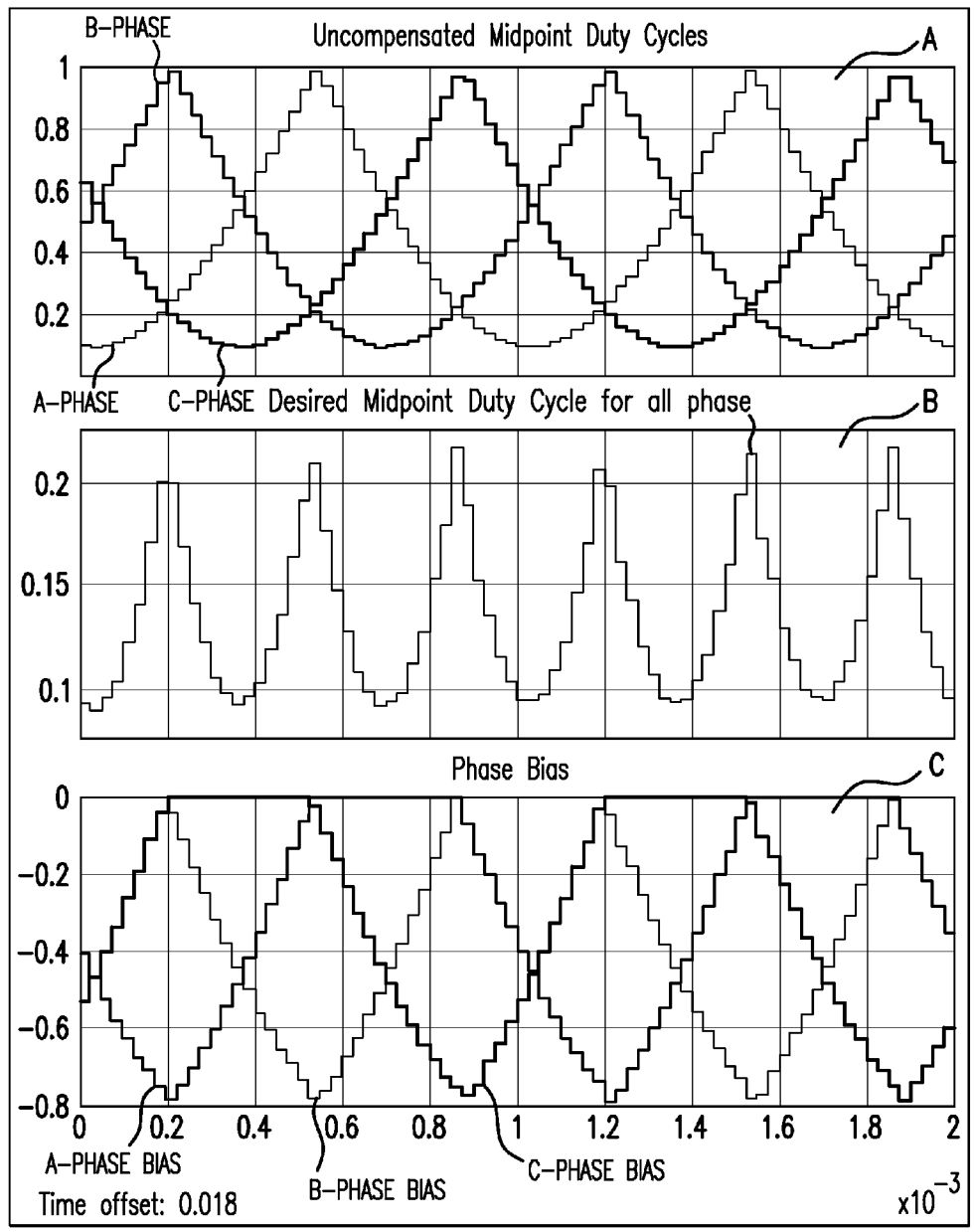
FIG. 5 shows uncompensated midpoint duty cycle waveforms, a desired midpoint duty cycle waveform, and phase bias value waveforms generated by the bias value generator.

Subtraction block 116 subtracts the uncompensated midpoint duty cycle waveform for each phase from the desired midpoint duty cycle for each phase, the difference forming the phase bias for the phase. FIG. 5 shows the exemplary uncompensated midpoint duty cycle waveform in chart A, the exemplary desired midpoint duty cycle waveform for all phases in chart B, and the exemplary phase bias waveforms in chart C.

Figure 6:
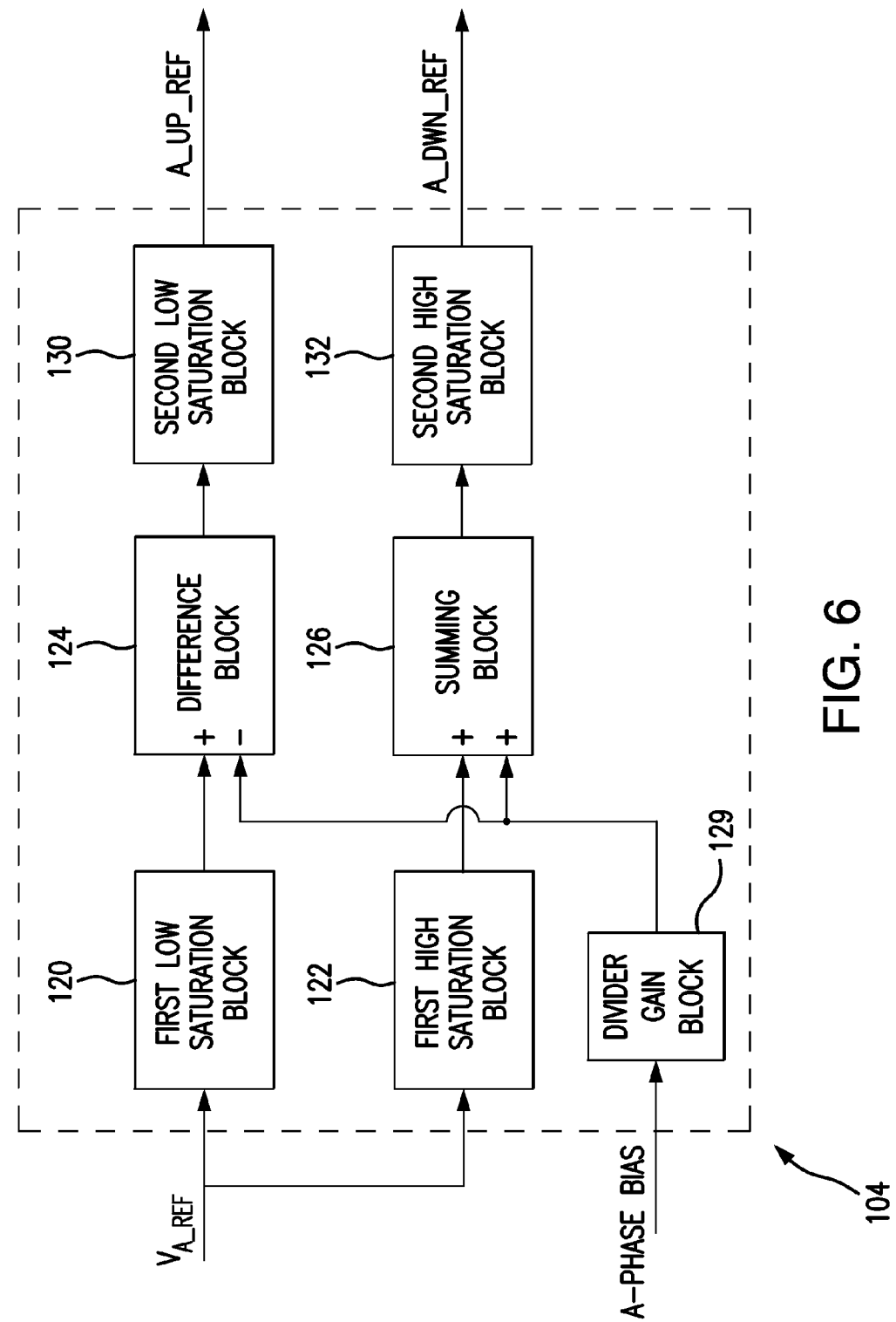
FIG. 6 is a logic flow diagram for the reference signal generator of FIG. 3, showing how the reference signal generator generates separate upper and lower reference signals.

With reference to FIG. 6, a logic flow diagram for reference signal generator 104 is shown. Reference signal generator 104 includes a first low saturation block 120, a difference block 124, and a second low saturation block 130. Reference signal generator 104 also includes a first high saturation block 122, a summing block 126, a second high saturation block 132, and a divider-gain block 129.

For each phase of converter 14 (shown in FIG. 2), reference signal generator receives the phase target output voltage waveform (e.g., $V_{A\_REF}$) at both first low saturation block 120 and first high saturation block 122. First low saturation block 120 replaces negative waveform values with zero, and provides the resulting waveform to difference block 124. First high saturation block 122 replaces positive values in the phase target output voltage waveform with zero, and provides the resulting waveform to summing block 126. Divider-gain block 129 also receives bias waveform (e.g. A-phase bias) from bias value generator 102 (shown in FIG. 3), divides the waveform by 2, and provides the halved bias waveform to both difference block 124 and summing block 126.

Difference block 124 subtracts the halved bias waveform from the waveform received from first low saturation block 120 and provides the resultant waveform to second low saturation block 130. Second low saturation block 130 replaces negative waveform values with zero and provides the resulting waveform to switch command signal generator 106 as a first reference signal (e.g., A_UP_REF) representative of a desired duty cycle for another switch of the converter phase leg.

Figure 7:
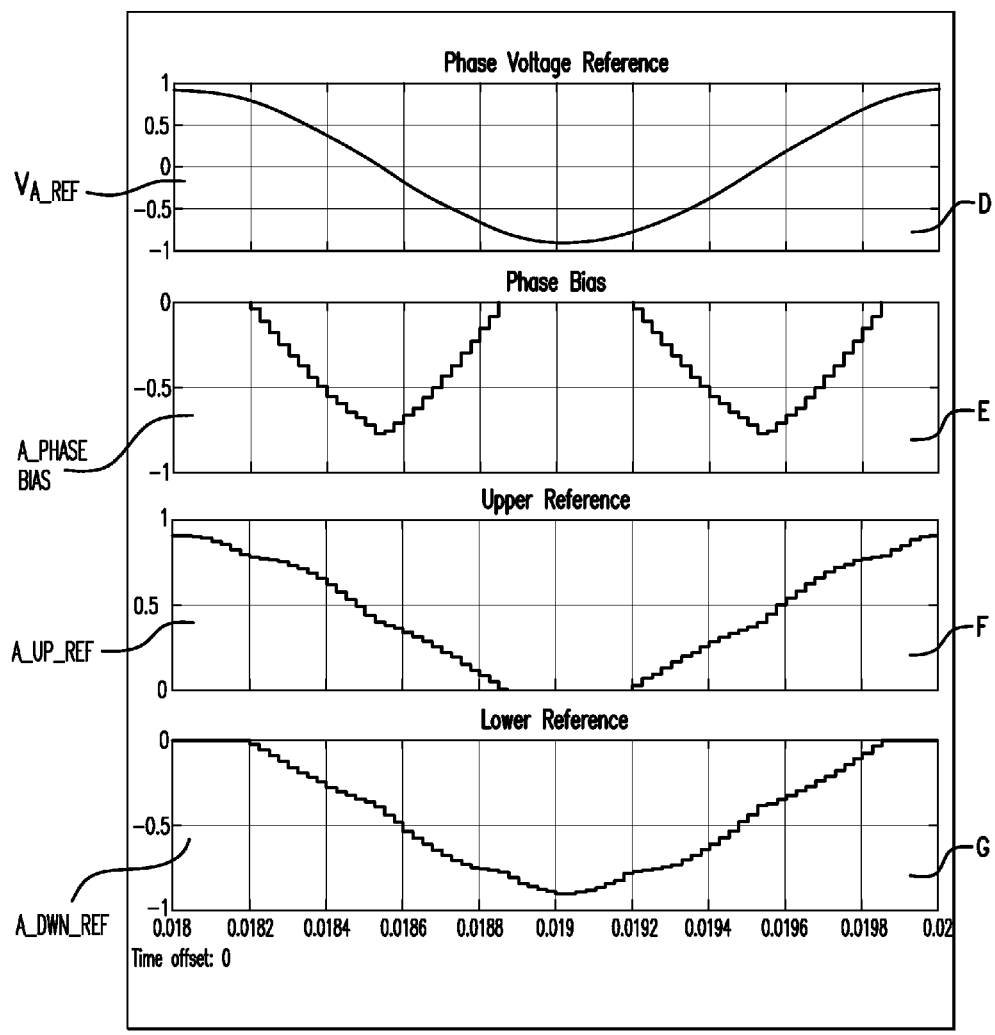
FIG. 7 shows the phase voltage reference signal, the phase bias signal, and the upper and lower reference signals generated by the reference signal generator.

Summing block 126 adds the halved bias waveform from the waveform received from first high saturation block 122 and provides the resultant waveform to second high saturation block 132. Second high saturation block 132 replaces negative waveform values with zero and also provides the resulting waveform to switch command signal generator 106 as a second switch reference signal (e.g., A_DWN_REF) representative of a desired duty cycle for another switch of the converter phase leg. FIG. 7 shows an exemplary target phase output voltage waveform in chart D, an exemplary phase bias waveform in chart E, an exemplary first switch reference signal in chart F, and an exemplary second switch reference in chart G.

Figure 8:
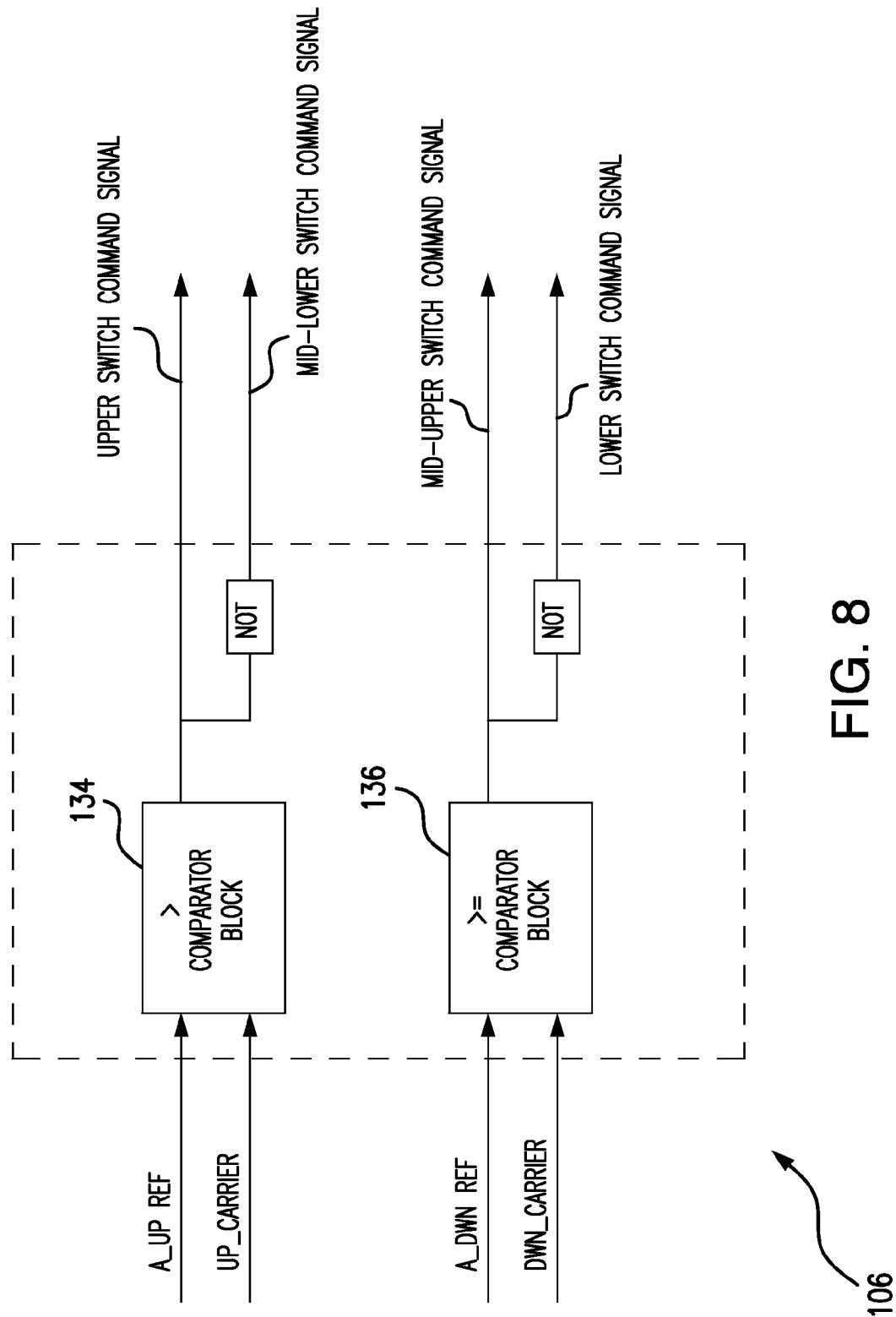
FIG. 8 is a logic flow diagram for the switch command signal generator of FIG. 3, showing how the switch command signal generator produced switch command signals.

With reference to FIG. 8, a logic diagram for switch command signal generator 106 is shown. Switch command signal generator 106 includes a first comparator block 134 and a second comparator block 136 for each phase of converter 14 (shown in FIG. 2). First comparator block 134 and second comparator block 136 cooperate with one another to generate pulse width modulated command signals for the switches of the converter phase legs using first and second carrier waves and the reference signal waveforms provided by reference signal generator 104 (shown in FIG. 3).

First comparator block 134 receives both a first carrier waveform (e.g., UP_CARRIER) from a carrier waveform generator 108 (shown in FIG. 3) and a phase first reference waveform (e.g. A_UP_REF). As illustrated if FIG. 3, the first carrier waveform is a triangle waveform. When the phase first reference waveform is greater than the first carrier waveform, an upper switch command signal toggles high and a mid-lower switch command signal toggles low, closing an upper switch of a phase leg of the converter (e.g., upper switch 42, shown in FIG. 2) and opening a mid-lower switch of the converter phase leg (e.g., mid-lower switch 46, shown in FIG. 2).

Second comparator block 136 receives both a second carrier waveform (e.g., DWN_CARRIER) from carrier waveform generator 108 (shown in FIG. 3) and a phase second reference waveform (e.g. A_DWN_REF). As illustrated in FIG. 3, the second carrier waveform is a also triangle waveform. When the phase second reference waveform is greater than the second carrier waveform, a mid-upper switch command signal toggles high and a lower switch command signal toggles low. This closes a mid-upper switch of the converter phase leg (e.g., mid-upper switch 44, shown in FIG. 2) and opens a lower switch of the converter phase leg (e.g., lower switch 48, shown in FIG. 2).

Figure 9:
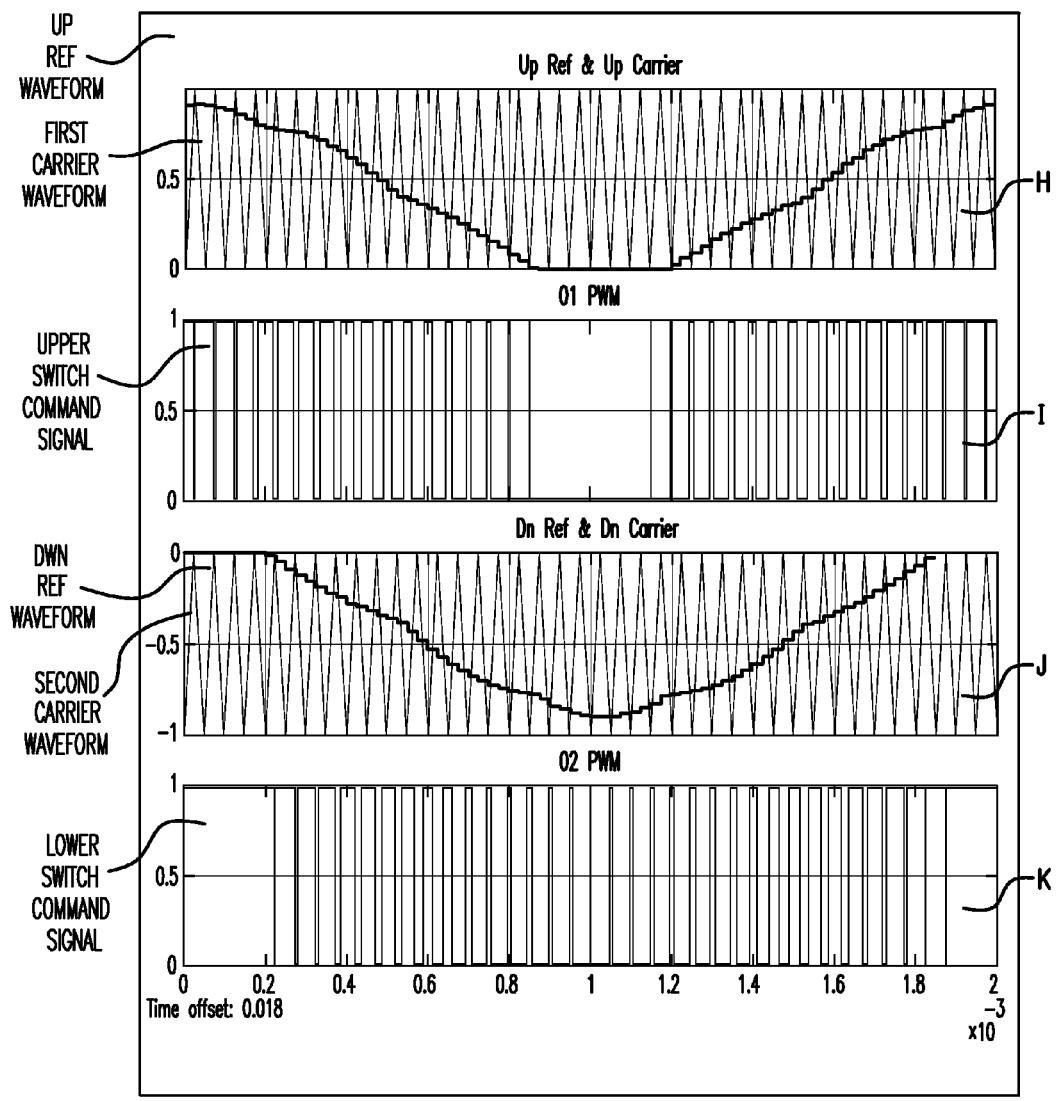
FIG. 9 shows the reference signals overlaying carrier signals for generating pulse width modulated switch command signals produced by the switch command signal generator.

FIG. 9 shows exemplary first reference and first carrier waveforms compared to one another in a chart H, an exemplary upper switch command signal in chart I, exemplary second reference and second carrier waveforms compared to one another in a chart J, and an exemplary mid-upper switch command signal in chart K. As will be appreciated, the mid-lower switch command signal is the inverse of the upper switch command signal. As will also be appreciated, the lower switch command signal is the inverse of the mid-upper switch command signal.

Figure 10:
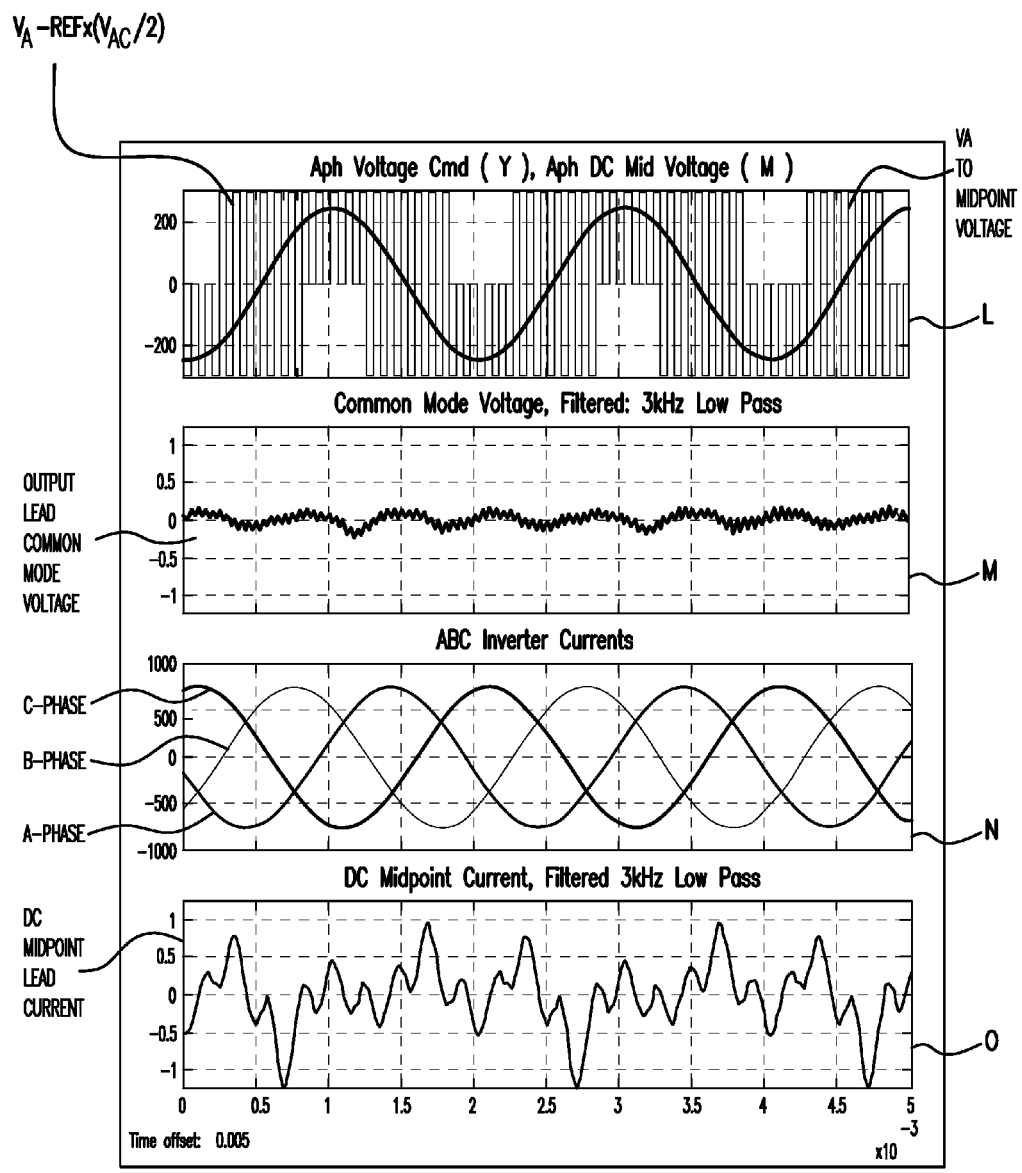
FIG. 10 shows the converter A-phase reference signal multiplied by one-half the DC input voltage, A-phase output voltage relative to the DC midpoint, common mode voltage of the converter, converter phase output currents, and DC midpoint lead current.

FIG. 10 graphically shows output lead common mode voltage and DC midpoint lead current for converter 14 (shown in FIG. 2). While each of the phase legs of the converter are inverting received DC power into a synthesized output three-phase AC current as shown in chart N, both common mode voltage and DC midpoint lead current are shown in charts M and O, respectively. In exchange for this performance, inverter controllers and methods of controlling inverter switches may employ greater switching frequencies that conventional inverter controllers and conventional methods of controlling inverter switches. For example, whereas conventional neutral-point clamped inverters typically switch for about one-half of the inverter fundamental period, embodiments of methods described herein may switch for more than one-half the inverter fundamental period. In certain embodiments, the inverter switching occurs throughout more than 80% of the inverter fundamental period, as illustrated in Chart L (shown in FIG. 10). Thus, increased switching losses may be experienced to conventional inverter controller and inverter switch control methods.

In embodiments described herein, inverter controllers and methods of controlling inverter switches can control power converters such that the integral of the DC midpoint lead current in a switching cycle is substantially equal to zero amps. This potentially prevents the DC link voltage balancing capacitors from the charging or discharging at different rates, and allows the capacitor voltages to remain balanced.

In certain embodiments, the duty cycles of each phase leg conducting to the DC midpoint lead can be substantially equivalent. The sum of the currents flowing from and to the DC midpoint lead can also substantially zero, allowing the DC midpoint lead current to average zero in each switching cycle.

In embodiments, the duty cycle for phase legs conducting to the DC midpoint lead can be reduced while maintaining the desired output voltages by increasing the duration intervals during of conduction to the DC positive and negative lead by equal amounts. This allows for the DC midpoint current flow average to be substantially zero, allowing for reduction in the size (e.g. weight) of DC link balancing capacitors typically required for a given application. Similarly, since little (or none) common mode low-frequency voltage is added, the size (weight) of the common mode inductors incorporated into the load can be also be reduced in size.

The methods and systems of the present disclosure, as described above and shown in the drawings, provide for power converters with superior properties including reduced (or eliminated) DC midpoint lead current and common mode voltage on the AC output leads. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling an inverter, comprising:
   receiving a target waveform for output voltage of an inverter phase;
   calculating a phase bias for an inverter phase using the target waveform;
   biasing the target waveform using the phase bias; and
   generating a switching device command signal by comparing the biased target waveform to a carrier waveform, wherein the switching device command signal reduces midpoint current in an inverter input lead and common mode voltage in an inverter output lead,
   wherein calculating the phase bias further comprises comparing an uncompensated midpoint duty cycle to a target midpoint duty cycle for a phase of the inverter, and
   wherein the uncompensated midpoint duty cycle for a phase of the inverter is calculated by consolidating output of low and high saturation blocks using the target waveform.

2. The method as recited in claim 1, wherein the target waveform includes an A-phase target waveform, wherein the method further includes receiving B-phase and C-phase target waveforms.

3. The method as recited in claim 1, wherein the phase bias includes an A-phase bias, wherein the method further includes calculating a B-phase bias and a C-phase bias.

4. The method as recited in claim 1, wherein biasing the target waveform further comprises generating first and second reference signals using the target waveform.

5. The method as recited in claim 4, further including:
   adding the phase bias to the first reference signal; and
   subtracting the phase from the second reference signal.

6. The method as recited in claim 4, wherein the switching device command signal is an upper switch command signal, and further including:
   generating the upper switch command signal by comparing a first switching command signal to a first carrier wave; and
   generating an intermediate lower switch command signal using an inverse of the output of the first switching command signal and first carrier wave comparison.

7. The method as recited in claim 6, further including:
   generating an intermediate upper switch command signal by comparing a second switching command signal to a second carrier wave; and
   generating a lower switch command signal using an inverse of the output of the second switching command signal and second carrier wave comparison.

8. A method of controlling an inverter, comprising:
   receiving a target waveform for output voltage of an inverter phase;
   calculating a phase bias for an inverter phase using the target waveform;
   biasing the target waveform using the phase bias; and
   generating a switching device command signal by comparing the biased target waveform to a carrier waveform, wherein the switching device command signal reduces midpoint current in an inverter input lead and common mode voltage in an inverter output lead,
   wherein calculating the phase bias further comprises comparing an uncompensated midpoint duty cycle to a target midpoint duty cycle for a phase of the inverter, and
   wherein the target midpoint duty cycle is calculated by inverting and biasing a maximum of the absolute value of the plurality of target waveforms.

9. A control system for an inverter, comprising:
a processor; and
a memory communicative with the processor, wherein the processor has instructions recorded thereon that, when read by the processor, cause the processor to:
receive a target waveform representative of output voltage of an inverter phase;
calculate a phase bias for an inverter phase using the target waveform;
bias the target waveform using the phase bias; and
generate a switching device command signal by comparing the biased target waveform to a carrier waveform, wherein the switching device command signal reduces midpoint current in an inverter input lead and common mode voltage in an inverter output lead,
wherein the phase bias is calculated by comparing an uncompensated midpoint duty cycle to a target midpoint duty cycle for a phase of the inverter, and
wherein the uncompensated midpoint duty cycle for a phase of the inverter is calculated by consolidating output of low and high saturation blocks using the target waveform.

10. The control system as recited in claim 9, wherein the instructions further cause the processor to bias the target waveform by generating first and second reference signals using the target waveform.

11. The control system as recited in claim 10, wherein the instructions further cause the processor to add the phase bias to the first reference signal and subtract the phase bias from the second reference signal.

12. A control system for an inverter, comprising:
a processor; and
a memory communicative with the processor, wherein the processor has instructions recorded thereon that, when read by the processor, cause the processor to:
receive a target waveform representative of output voltage of an inverter phase;
calculate a phase bias for an inverter phase using the target waveform;
bias the target waveform using the phase bias; and
generate a switching device command signal by comparing the biased target waveform to a carrier waveform, wherein the switching device command signal reduces midpoint current in an inverter input lead and common mode voltage in an inverter output lead,
wherein the phase bias is calculated by comparing an uncompensated midpoint duty cycle to a target midpoint duty cycle for a phase of the inverter, and
wherein the target midpoint duty cycle is calculated by inverting and biasing a maximum of the absolute value of the plurality of target waveforms.

* * * * *